United States Patent
Zhiqiang

(10) Patent No.: US 12,092,252 B2
(45) Date of Patent: Sep. 17, 2024

(54) NOISE ABATEMENT FITTING FOR AQUARIUM DOWNPIPE

(71) Applicant: CHENGDU ZHITUO AQUATICS CO., LTD., Chengdu (CN)

(72) Inventor: Yu Zhiqiang, Chengdu (CN)

(73) Assignee: CHENGDU ZHITUO AQUATICS CO., LTD., Chengdu (CN)

( * ) Notice: Subject to any disclaimer, the term of this patent is extended or adjusted under 35 U.S.C. 154(b) by 326 days.

(21) Appl. No.: 17/805,743

(22) Filed: Jun. 7, 2022

(65) Prior Publication Data
US 2023/0392738 A1    Dec. 7, 2023

(51) Int. Cl.
F16L 55/033    (2006.01)
A01K 63/00     (2017.01)
F16L 55/04     (2006.01)

(52) U.S. Cl.
CPC ........ F16L 55/0331 (2013.01); A01K 63/006 (2013.01)

(58) Field of Classification Search
CPC ... F16L 55/0331; F16L 55/033; F16L 55/035; F16L 55/04; F16L 55/045; F16L 55/05; A01K 63/006; A01K 63/00; A01K 63/04; F01N 1/083
See application file for complete search history.

(56) References Cited

U.S. PATENT DOCUMENTS

| | | | | |
|---|---|---|---|---|
| 728,105 A | * | 5/1903 | Hipple et al. | F01N 1/083 181/281 |
| 1,251,956 A | * | 1/1918 | Bletcher | F01N 1/08 181/264 |
| 2,458,102 A | * | 1/1949 | Schott | F01N 1/083 181/264 |
| 2,588,555 A | * | 3/1952 | Molloy | F16K 47/02 251/126 |
| 2,766,840 A | * | 10/1956 | Munroe | F16L 55/033 181/233 |
| 3,187,834 A | * | 6/1965 | Cassilly | F01N 1/083 181/283 |
| 3,966,015 A | * | 6/1976 | Bychinsky | F01N 1/06 181/268 |
| 4,228,822 A | * | 10/1980 | Fisher | F15D 1/10 138/46 |
| 4,299,305 A | * | 11/1981 | Eriksson | F01N 1/082 181/258 |

(Continued)

FOREIGN PATENT DOCUMENTS

DE    102015003859 A1 * 9/2016
KR    19980049585 U  * 10/1998

(Continued)

*Primary Examiner* — Edgardo San Martin
(74) *Attorney, Agent, or Firm* — Mark Young, PA

(57) ABSTRACT

A noise abatement fitting for an aquarium standpipe includes a coupling mated with the open end of the standpipe, a hub connected to the coupling with at least one connecting arm. A hollow externally threaded vent tube is threadedly engaged by the hub and has one end extending into the open end of the standpipe. A baffle with an outer diameter decreasing from the top to the bottom of the baffle is attached to the bottom of the vent tube and extends into and occupies a central portion (not the entirety) of the open end of the standpipe, leaving an annular space unobstructed for overflow.

20 Claims, 6 Drawing Sheets

(56) References Cited

U.S. PATENT DOCUMENTS

| | | | | |
|---|---|---|---|---|
| 5,234,161 | A * | 8/1993 | Harrison, Jr. | B05B 15/658 |
| | | | | 239/550 |
| 5,728,293 | A * | 3/1998 | Guoli | A01K 63/045 |
| | | | | 210/903 |
| 5,881,555 | A * | 3/1999 | Jaeger | B63H 21/32 |
| | | | | 440/89 C |
| 6,056,886 | A * | 5/2000 | Hickok, Jr. | A01K 63/04 |
| | | | | 210/776 |
| 6,089,347 | A * | 7/2000 | Flugger | F01N 1/02 |
| | | | | 181/275 |
| 6,770,194 | B1 * | 8/2004 | McGrath | A01K 63/04 |
| | | | | 137/395 |
| 7,000,568 | B1 * | 2/2006 | Mihlbauer | A01K 63/006 |
| | | | | 119/263 |
| 8,851,231 | B1 * | 10/2014 | Murphy | F01N 1/168 |
| | | | | 181/254 |

FOREIGN PATENT DOCUMENTS

| | | | | |
|---|---|---|---|---|
| KR | 100764575 | B1 | * | 10/2007 |
| KR | 100911385 | B1 | * | 8/2009 |
| KR | 20100109782 | A | * | 10/2010 |
| KR | 20140037997 | A | * | 3/2014 |

* cited by examiner

NOISE ABATEMENT FITTING FOR AQUARIUM DOWNPIPE

FIELD OF THE INVENTION

This invention relates generally to aquariums, and, more particularly, to a fitting for reducing noise caused by water and air flow in a downpipe.

BACKGROUND OF THE INVENTION

An aquarium filtration system is an important component of a healthy fish tank. An efficient aquarium filter will help maintain good water quality in both freshwater and saltwater aquariums. They can help tremendously in maintaining water parameters in between regular water changes.

Today, many aquarium systems include a sump with filtration components. Water, from a fish tank, flows through a vertical standpipe into the sump, where it is filtered. Some sumps may provide several stages of filtration. The filtered water is then pumped, through plumbing from the sump, into the fish tank.

In many aquariums, the standpipe is a vertical pipe with an open end at the water level in the fish tank. As filtered water is supplied from the sump to the fish tank, water overflows from the fish tank into the open end of the standpipe. Typically, the overflowing water does not fill the standpipe. Instead, water occupies a portion of the standpipe, typically near the interior wall of the pipe. Air occupies remaining space in the standpipe. Mixing and flowing of water and air in the standpipe produces audible noises.

What is needed is a noise abatement fitting that attaches to the open end of the standpipe. The fitting should be adjustable to accommodate a range of flow rates. The fitting should abate noise without impeding water flow through a standpipe to a sump.

The invention is directed to overcoming one or more of the problems and solving one or more of the needs as set forth above.

SUMMARY OF THE INVENTION

To solve one or more of the problems set forth above, in an exemplary implementation of the invention, a noise abatement fitting for an aquarium with a standpipe is provided. The noise abatement fitting includes a coupling for mating with an open end of a standpipe. A hub with a central internally threaded opening is connected to the coupling with at least one connecting arm (e.g., one or more L-shaped connecting arms) extending from the hub to the coupling. The hub is in coaxial alignment with and spaced apart from the coupling. The hub threadedly engages a hollow externally threaded vent tube. A channel that serves as a flow path for air extends through the vent tube from one end to the opposite end. A baffle is attached to the vent tube at the bottom end of the vent tube. The baffle includes a structure with a top, a bottom, and a varying outer diameter. The outer diameter is greatest at the top of the baffle. The outer diameter is least at the bottom of the baffle. The outer diameter is intermediate between the top and bottom of the baffle. The outer diameter at the bottom of the baffle is less than an inner diameter of the standpipe. The baffle is in coaxial alignment with the vent tube.

The baffle may take many forms. In one embodiment, the baffle includes a plurality of spaced apart parallel discs, including a top disc having a first diameter, a bottom disc having a third diameter, and at least one intermediate disc. The intermediate disc has a second diameter. The third diameter is less than the first diameter and less than the second diameter. The second diameter is less than the first diameter. In another embodiment, the baffle is a hemispherical structure. In yet another embodiment, the baffle is a conical (e.g., frusto-conical) structure.

A lock nut may be threaded onto the vent tube and abut the hub. By way of example, the lock nut may be a hexagonal nut, wingnut or thumb nut.

When installed, the coupling is attached to the open end of the standpipe. The baffle extends into the open end of the standpipe and occupies a central portion (not the entirety) of the open end of the standpipe. An annular space within the open end of the standpipe remains unobstructed for free overflow of water into the open end of the standpipe. The bottom end of the vent tube extends into the open end of the standpipe.

BRIEF DESCRIPTION OF THE DRAWINGS

The foregoing and other aspects, objects, features and advantages of the invention will become better understood with reference to the following description, appended claims, and accompanying drawings, where:

DETAILED DESCRIPTION

Figure 1:
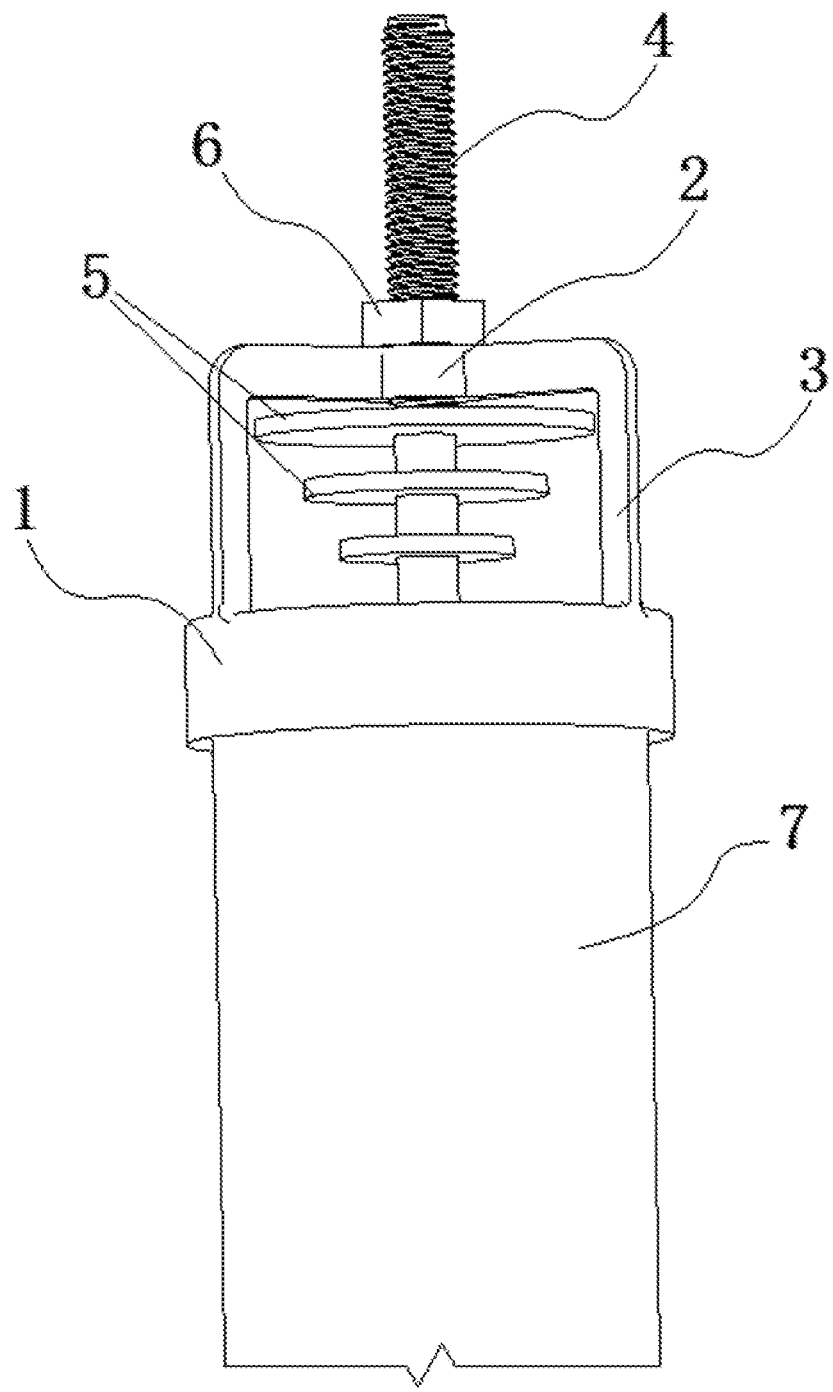
FIG. 1 is side view of an exemplary noise abatement fitting installed on the open end of a standpipe according to principles of the invention.

In this description, it should be understood that the terms "longitudinal", "horizontal", "upper", "lower", "front", "rear", "left", "right", "vertical", "Horizontal", "Top", "Bottom", "Inner", "Outer" and other directions or positional relations are based on the positions or positional relations shown in the drawings, and are only for the convenience of describing the present invention, not to indicate or imply that the device or element must have a specific orientation or be constructed and operated in a specific orientation. Therefore, such terms should not be understood as a limitation of the present invention.

As shown in FIGS. 1-4, a noise abatement fitting for an aquarium downpipe includes a hub 2 with a pipe coupling 1. The hub 2 is connected to the pipe coupling 1 by one or more connecting arms 3. In the exemplary embodiment, the connecting arms are L-shaped arms that extend from the pipe coupling 1 to the hub 2. The coupling 1 and hub 2 are aligned and concentric, i.e., a central vertical axis extends through the center of the coupling 1 and hub 2. In the exemplary embodiment, the coupling 1 is spaced apart from the hub 2 a sufficient distance to allow complete withdrawal of the baffle 5 from the open end of the standpipe 7 and the coupling 1. Thus, the distance between the coupling 1 and hub 2 is at least as great as the height of the entire baffle 5.

The pipe coupling 1 is connected to an open end of the standpipe 7, into which water overflows. The pipe coupling 1 is sized and shaped to receive the open end of a standpipe 7. Thus, the inner diameter of the coupling 1 is about equal to (and only slightly larger than) the outer diameter of the open end of a standpipe 7. The coupling 1 may be pressed on to the open end of a standpipe 7, bonded to the open end of a standpipe 7, or otherwise mechanically secured to the open end of a standpipe 7.

A vent pipe 4 engages the hub 2. In the exemplary embodiment, the vent pipe 4 is a hollow leadscrew. The hub 2 is internally threaded to threadedly receive the vent pipe 4. A channel 8 (FIGS. 5-8) extends through the vent pipe 4, from the top of the vent pipe 4 to the bottom of the vent pipe 4. The channel 8 allows free air flow to the center of the open end of the standpipe 7. Thus, the channel 8 defines an air flow path that extends through the vent pipe 4 and through the baffle 5 attached to the vent pipe 4. The flow path allows air flow through the vent pipe 4, from the top end of the vent pipe 4 to the bottom end of the vent pipe 4, and through the baffle 5 attached to the vent pipe 4, into the open end of the standpipe 7 at the center of the open end of the standpipe 7.

In addition to providing an air flow path, the externally threaded vent pipe 4 operates as a linear actuator. Rotation of the vent pipe 4 in one direction relative to the hub 2 causes the vent pipe 4 to advance through the hub 2 towards the coupling 1. Such rotation causes the baffle 5 to move linearly towards the coupling 1 and the open end of the standpipe 7. Rotation of the vent pipe 4 in the opposite direction relative to the hub 2 causes the vent pipe 4 to advance through the hub 2 away from the coupling 1. Such rotation causes the baffle 5 to move linearly away from the coupling 1 and the open end of the standpipe 7. Thus, by rotating the vent pipe 4, the baffle 5 may be positioned at a location relative to the coupling 1 and the open end of the standpipe 7 that allows water to freely overflow into the standpipe 7 but suppresses noise from the mixing and flow of air and water in the standpipe 7.

A baffle 5 is attached at or near the bottom end of the vent pipe 4. The baffle 5 does not block or otherwise seal the bottom open end of the vent pipe 4. The baffle 5 is attached in a manner that does not impede the flow of air into the open end of the standpipe 7 at the center of the open end of the standpipe 7.

Audible noise is caused by the interaction between air and the water flow at the open end of the standpipe 7. The baffle 5 partially shields the open end of the standpipe 7 to form a water passage, while air flows through the vent pipe 4 to minimize interaction of water and air at the open end of the standpipe 7. This arrangement, which reduces interaction between air and water flow at the open end of the standpipe 7, attenuates audible noise.

In an exemplary embodiment, the baffle 5 is connected to the vent pipe 4 by glue bonding, overmolding or integral molding. The baffle 5 provides a varying outer diameter. The outer diameter increases from the bottom to the top of the baffle 5. Thus, the baffle 5 may be positioned to block less or more of the open end of the standpipe 7. The baffle should not be positioned to appreciably impede water overflow into the open end of the standpipe 7. Concomitantly, the baffle 5 should not be positioned to expose substantially more of open end of the standpipe 7 than is necessary to allow unimpeded water overflow into the open end of the standpipe 7.

The exemplary baffle 5 includes a plurality of parallel, spaced-apart circular discs, with different diameters that gradually decrease from the top disc to the bottom disc. The water passages formed between the discs of different diameters and the standpipe 7 are arranged at intervals on the vent pipe 4, which can be adjusted according to the size of the fish tank, or the size of the water pump, to match the pumping of the water pump. This configuration allows adjustment of the baffle 5 to accommodate the flow rate of the water cycle.

Figure 2:
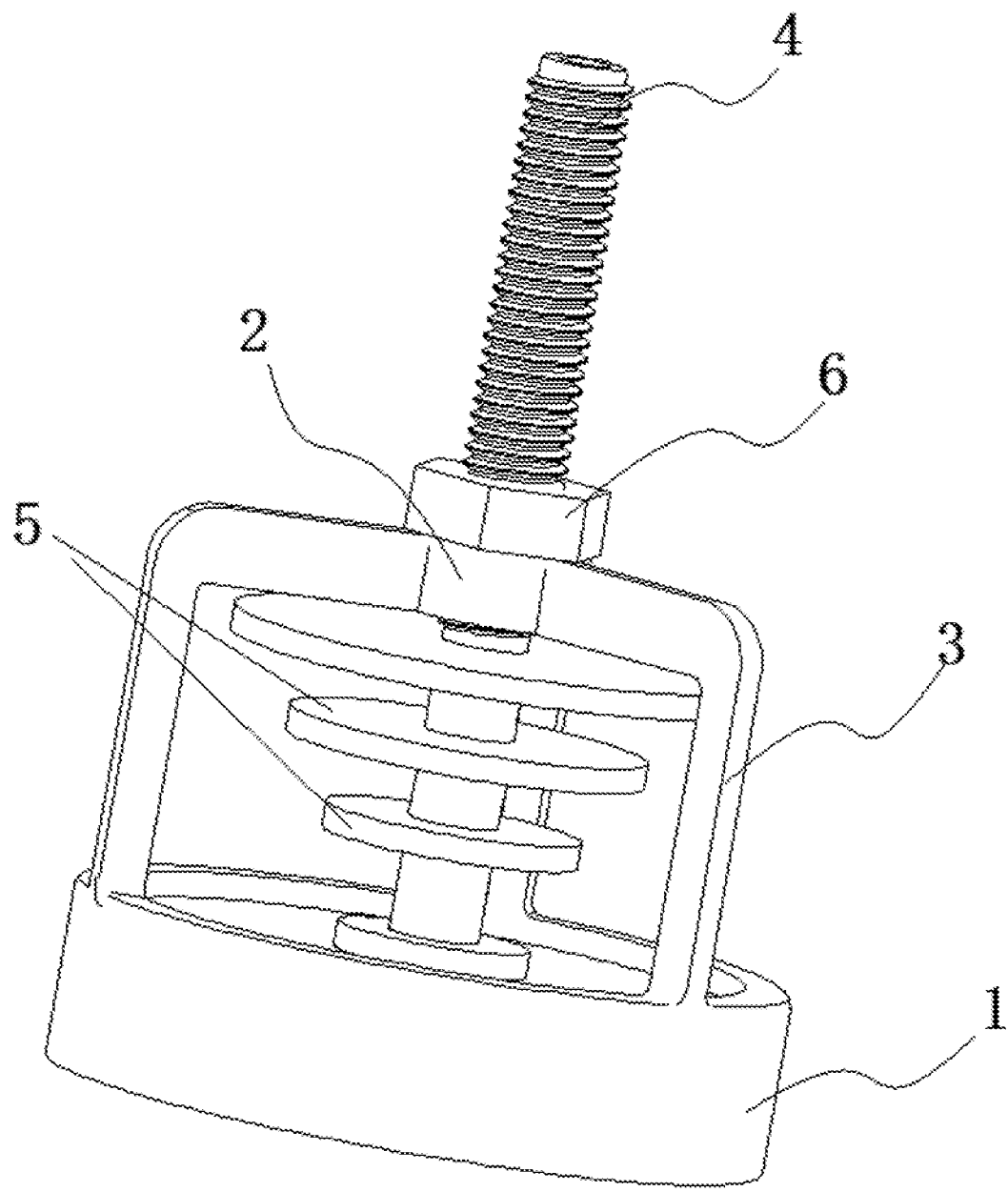
FIG. 2 is perspective view of an exemplary noise abatement fitting according to principles of the invention.
Figure 3:
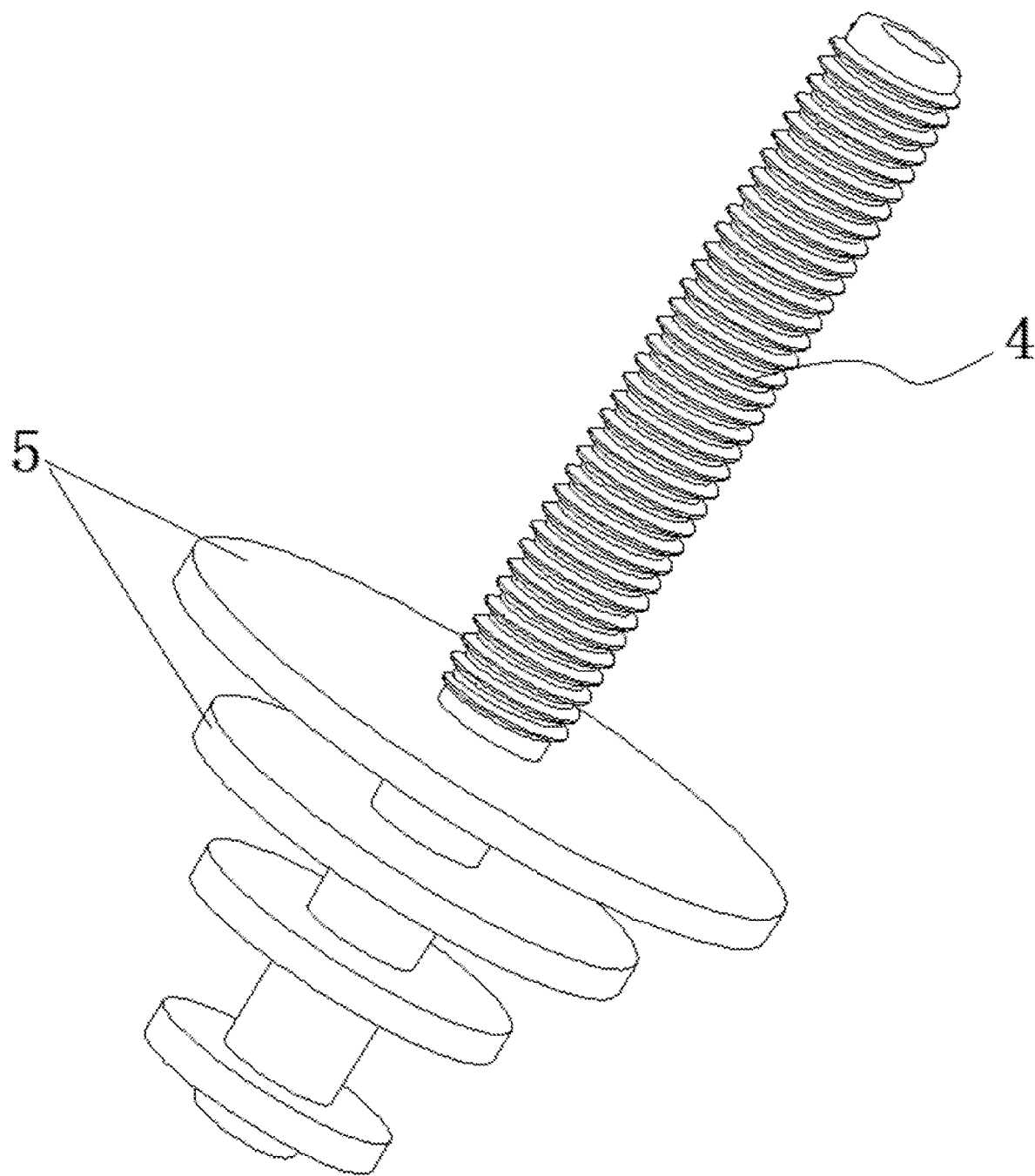
FIG. 3 is perspective view of an exemplary actuator and baffle for a noise abatement fitting according to principles of the invention.
Figure 4:
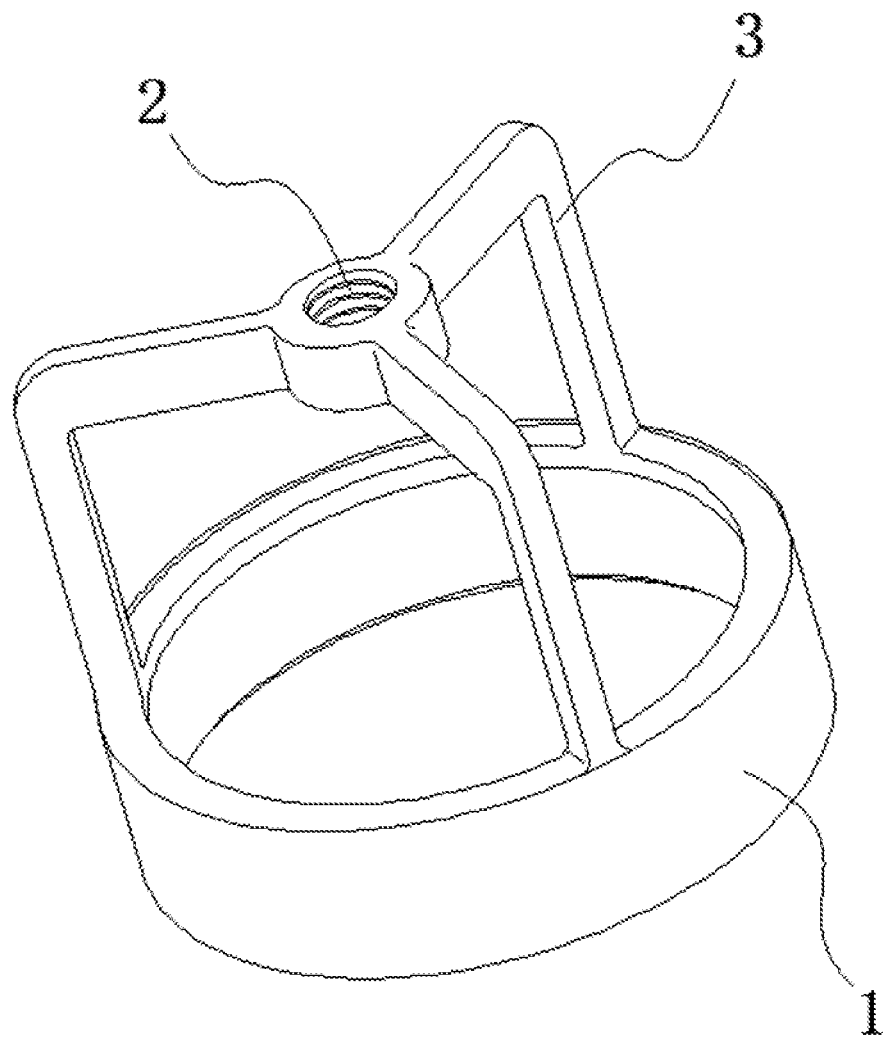
FIG. 4 is perspective view of an exemplary hub for a noise abatement fitting according to principles of the invention.
Figure 5:
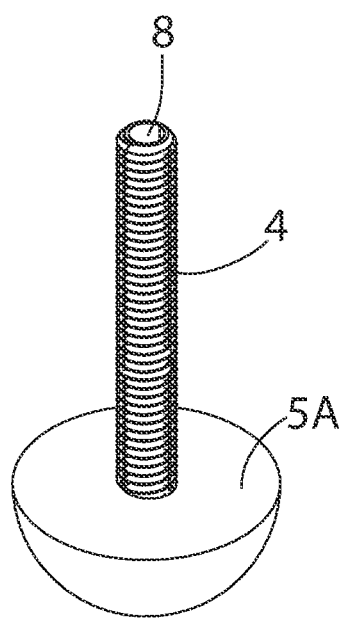
FIG. 5 is side view of an exemplary alternative hemispherical baffle for a noise abatement fitting according to principles of the invention.
Figure 6:
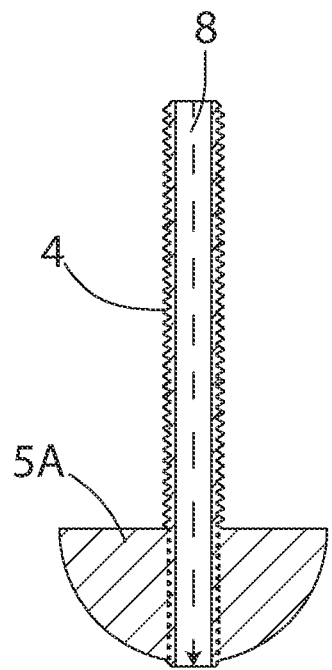
FIG. 6 is perspective view of the exemplary alternative hemispherical baffle for a noise abatement fitting according to principles of the invention.
Figure 7:
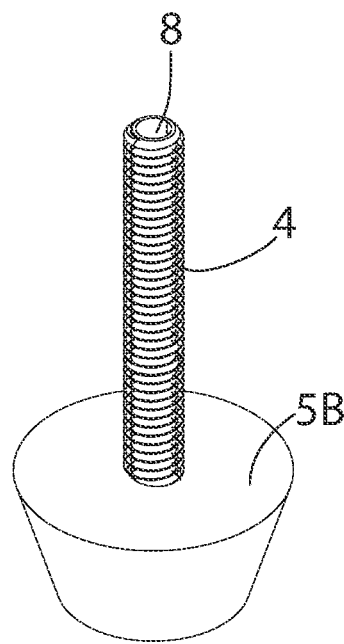
FIG. 7 is side view of an exemplary alternative conical baffle for a noise abatement fitting according to principles of the invention.
Figure 8:
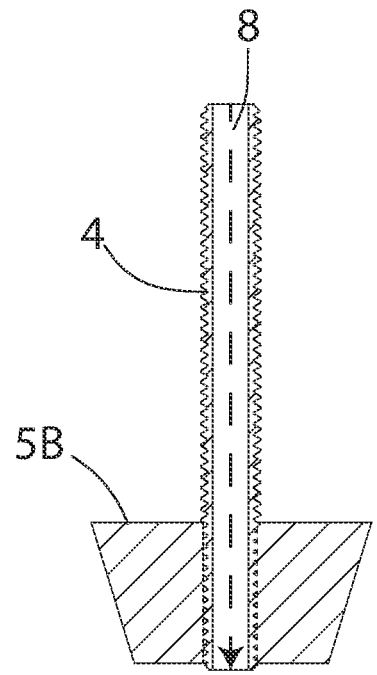
FIG. 8 is perspective view of the exemplary alternative conical baffle for a noise abatement fitting according to principles of the invention; and Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

While a baffle 5 comprising a plurality of spaced apart parallel discs of decreasing diameter is shown in FIGS. 1-3, the invention is not so limited. Other varying diameter baffle structures may be used without departing from the scope of the invention. For example, in FIGS. 5 and 6 a hemispherical baffle 5A is shown. In FIGS. 7 and 8, a conical (e.g., frusto-conical) baffle 5B is shown. In each case, the baffle may be lowered until a sufficient portion of the open end of the standpipe 7 is covered, while water remains free to overflow into the open end of the standpipe 7.

The outlet (bottom) of the vent pipe 4 extends into the standpipe 7, and the baffle blocks a portion of the open end of the standpipe 7. The outlet from the vent pipe 4 needs to be lower than the open end of the standpipe 7.

In an exemplary embodiment, the vent tube 4 is threaded into the hub 2, so that the bottom end of the vent tube 4 and at least a portion of the baffle may be located in the center of the open end of the standpipe 7, when the fitting is installed. The hub 2 is an internally threaded circular collar, with internal threads configured to threadedly engage the external threads of the vent tube 4. The coupling 1 is a circular sleeve-shaped section with an internal diameter sized to mate with the outer diameter of the fish tank standpipe 7. The coupling 1 connects the fitting to the open end of the standpipe 7. The coupling 1 and hub 2 are arranged coaxially. The baffle 5 is located to blocks a central portion of the open end of the standpipe 7. This blockage leaves exposed a uniform annular water passage, which prevents turbulence of the water flow and the formation of appreciable audible water sound. The area of the annular water passage may be increased or decreased by moving the baffle 5 away or towards the open end of the standpipe 7.

In an exemplary embodiment, the vent pipe 4 is connected to the hub 2 through threaded matching. After the threaded matching connection, the height of the baffle 5 can be adjusted directly by rotating the vent pipe 4. Since the diameter of the baffle is gradually reduced, when adjusting the height of the baffle from top to bottom, the water passage gradually decreases.

In an exemplary embodiment, a lock nut 6 may be provided on the vent pipe 4. The lock nut 6 is optional. The lock nut 6 may guard against unintended rotation of the vent tube 4, due to factors such as water flow or vibration. FIGS.

1 and 2 shows an ordinary hexagon nut. However, a wing nut, thumb nut or other type of nut may be used in lieu of an ordinary hexagon nut, without departing from the scope of the invention. As another option, a set screw may optionally extend through the side of the hub 2 to prevent unintended rotation of the vent tube 4. To enable adjustment of the vent tube 4, the lock nut 6 or set screw is loosened. Then the vent tube 4 may be rotated.

In practical applications, water does not fill the standpipe 7. There is air ingress. The choice of the diameter of the channel 8 is particularly important. If it is too large, appreciable audible sound will emanate. If too small, it can impede laminar flow through the standpipe 7. Channel diameters of 3 mm to 12 mm work well for many home use aquariums with standpipes and sumps.

The silencer of the present application can also be applied to other open-end pipes that through which a liquid mixes with air. Appropriate connection structure replacements can be made according to the principles of the invention.

The invention provides a noise abatement fitting for an aquarium standpipe. The fitting includes a pipe coupling 1 and a hub 2 connected by a connecting arm 3. The coupling 1 is connected to an open end of a standpipe 7. A vent tube 4 is received in the hub 2. A baffle 5 is provided on the bottom of the vent tube 4.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A noise abatement fitting for an aquarium with a standpipe, the noise abatement fitting comprising:
   a coupling for mating with an open end of a standpipe;
   a hub, the hub including a central internally threaded opening, at least one connecting arm extending from the hub to the coupling, the hub being in coaxial alignment with and spaced apart from the coupling;
   a vent tube, the vent tube being hollow and externally threaded, the hub threadedly engaging the vent tube, the vent tube including a first end and a second end, the second end being opposite the first end;
   a baffle attached to the vent tube at the second end of the vent tube, the baffle comprising a structure with a top, a bottom, and a varying outer diameter, the outer diameter being greatest at the top of the baffle and the outer diameter being least at the bottom of the baffle, and the outer diameter being intermediate between the top and bottom of the baffle, the baffle being in coaxial alignment with the vent tube.

2. The noise abatement fitting of claim 1, the baffle comprising a plurality of spaced apart parallel discs, including a top disc having a first diameter, a bottom disc having a third diameter, and at least one intermediate disc, the intermediate disc having a second diameter, the third diameter being less than the first diameter and less than the second diameter, and the second diameter being less than the first diameter.

3. The noise abatement fitting of claim 1, the baffle comprising a hemispherical structure.

4. The noise abatement fitting of claim 1, the baffle comprising a conical structure.

5. The noise abatement fitting of claim 1, the at least one connecting arm comprising at least one L-shaped arm.

6. The noise abatement fitting of claim 1, the at least one connecting arm comprising a plurality of connecting arms.

7. The noise abatement fitting of claim 1, a lock nut threaded onto the vent tube and abutting the hub.

8. The noise abatement fitting of claim 1, a channel extending through the vent tube from the first end to the second end, the channel defining a path for air flow.

9. The noise abatement fitting of claim 1, the outer diameter at the bottom of the baffle being less than an inner diameter of the standpipe.

10. A noise abatement fitting attached to an aquarium standpipe, comprising:
    a standpipe including a vertical pipe with an open end into which aquarium water overflows, the open end having an inner diameter;
    a noise abatement fitting comprising:
      a coupling attached to the open end of the standpipe;
      a hub, the hub including a central internally threaded opening, at least one connecting arm extending from the hub to the coupling, the hub being in coaxial alignment with and spaced apart from the coupling, the hub also being in coaxial alignment with the standpipe;
      a vent tube, the vent tube being hollow and externally threaded, the hub threadedly engaging the vent tube, the vent tube including a first end and a second end, the second end being opposite the first end;
      a baffle attached to the vent tube at the second end of the vent tube, the baffle comprising a structure with a top, a bottom, and a varying outer diameter, the outer diameter being greatest at the top of the baffle and the outer diameter being least at the bottom of the baffle, and the outer diameter being intermediate between the top and bottom of the baffle, the baffle being in coaxial alignment with the vent tube, the outer diameter at the bottom of the baffle being less than an inner diameter at the open end of the standpipe.

11. The noise abatement fitting attached to an aquarium standpipe of claim 10, the baffle comprising a plurality of spaced apart parallel discs, including a top disc having a first diameter, a bottom disc having a third diameter, and at least one intermediate disc, the intermediate disc having a second diameter, the third diameter being less than the first diameter and less than the second diameter, and the second diameter being less than the first diameter.

12. The noise abatement fitting attached to an aquarium standpipe of claim 10, the baffle comprising a hemispherical structure.

13. The noise abatement fitting attached to an aquarium standpipe of claim 10, the baffle comprising a conical structure.

14. The noise abatement fitting attached to an aquarium standpipe of claim 10, the at least one connecting arm comprising at least one L-shaped arm.

15. The noise abatement fitting attached to an aquarium standpipe of claim 10, the at least one connecting arm comprising a plurality of connecting arms.

16. The noise abatement fitting attached to an aquarium standpipe of claim 10, a lock nut threaded onto the vent tube and abutting the hub.

17. The noise abatement fitting attached to an aquarium standpipe of claim 10, a channel extending through the vent tube from the first end to the second end, the channel defining a path for air flow.

18. The noise abatement fitting attached to an aquarium standpipe of claim 10, the baffle extending into the open end of the standpipe and occupying a central portion of the open end of the standpipe, and an annular space within the open end of the standpipe being unobstructed.

19. The noise abatement fitting attached to an aquarium standpipe of claim 18, the second end of the vent tube extending into the open end of the standpipe.

20. The noise abatement fitting attached to an aquarium standpipe of claim 10, the second end of the vent tube extending into the open end of the standpipe.

* * * * *